United States Patent [19]

Tachi

[11] 4,423,440

[45] Dec. 27, 1983

[54] CODE SIGNAL READING APPARATUS

[75] Inventor: Katsuichi Tachi, Kawasaki, Japan

[73] Assignee: Sony Corporation, Tokyo, Japan

[21] Appl. No.: 302,607

[22] Filed: Sep. 15, 1981

Related U.S. Application Data

[63] Continuation-in-part of Ser. No. 47,765, Jun. 12, 1979, abandoned.

[30] Foreign Application Priority Data

Jun. 19, 1978 [JP] Japan ................................. 53-73979

[51] Int. Cl.³ ............................................. H04N 5/76
[52] U.S. Cl. ...................................... 358/335; 331/20; 358/147
[58] Field of Search ............... 358/147, 335, 337, 339, 358/312, 320, 145; 360/9.1, 10.1, 10.2, 10.3, 14.1, 14.2, 14.3, 36.1, 70, 72.2, 75, 76, 77; 331/18, 20, 25

[56] References Cited

U.S. PATENT DOCUMENTS

| | | | |
|---|---|---|---|
| 3,493,674 | 2/1970 | Houghton | 358/147 |
| 3,573,360 | 4/1971 | Rose, Jr. | 360/72.2 |
| 4,040,100 | 8/1977 | Chan | 360/14.3 |
| 4,159,480 | 6/1979 | Tachi | 358/147 X |
| 4,167,028 | 9/1979 | Tobey | 360/72.2 |
| 4,293,879 | 10/1981 | Heitmann et al. | 360/10.3 |

Primary Examiner—Stuart N. Hecker
Assistant Examiner—Donald McElheny, Jr.
Attorney, Agent, or Firm—Hill, Van Santen, Steadman & Simpson

[57] ABSTRACT

The present invention allows code signals from a video signal to be read even though the signal is being reproduced at non-standard speed, a reference oscillator and programmable frequency divider are utilized with a time width detector and the frequency dividing ratio of the programmable frequency divider is controlled so as to assure that the video code signal can be detected even at non-standard speeds.

4 Claims, 34 Drawing Figures

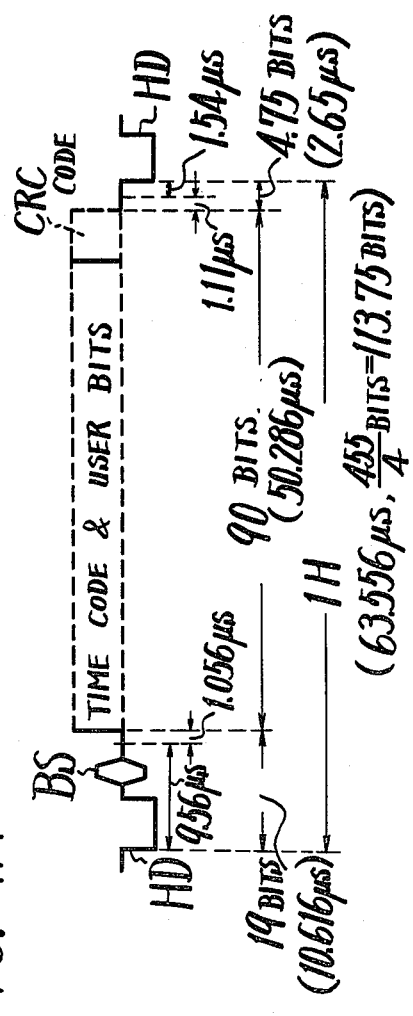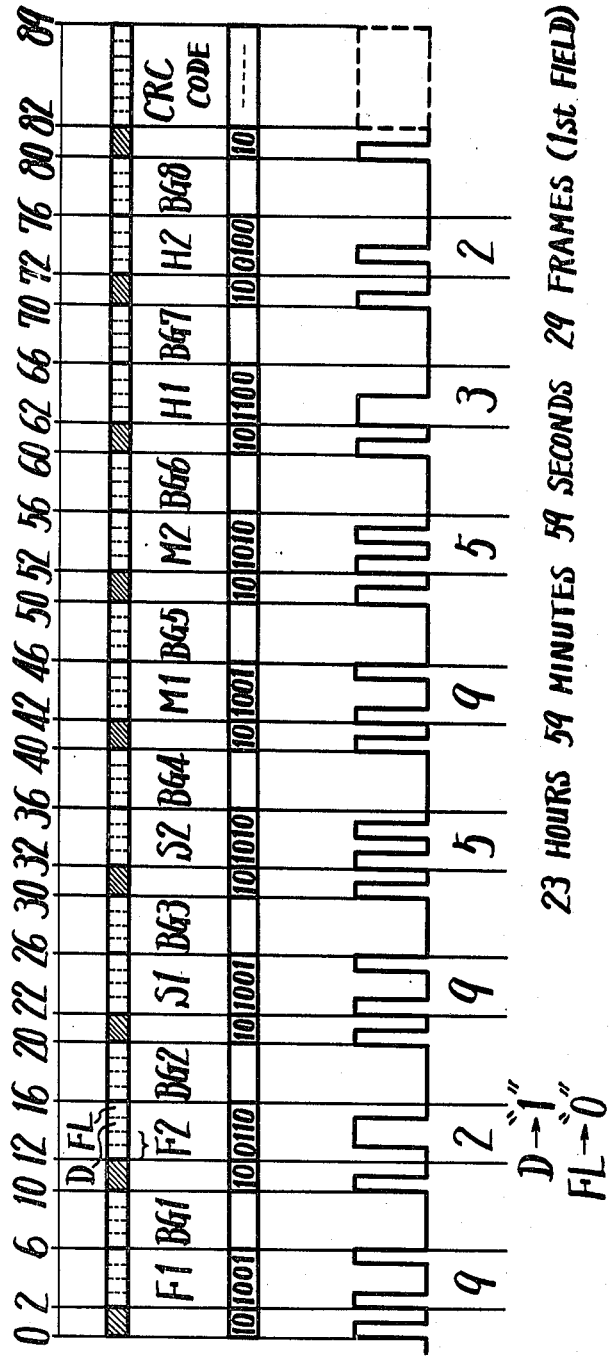

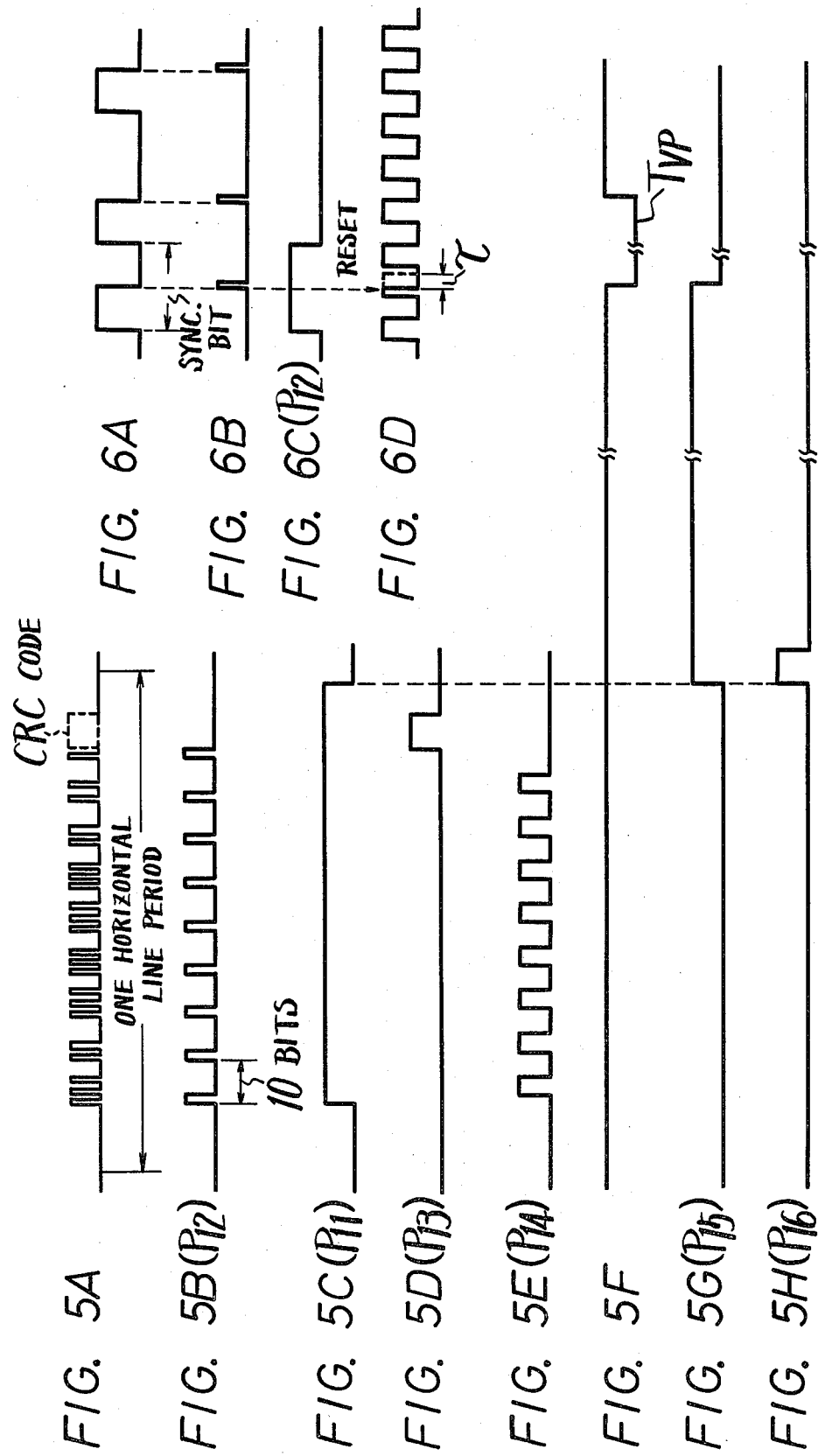

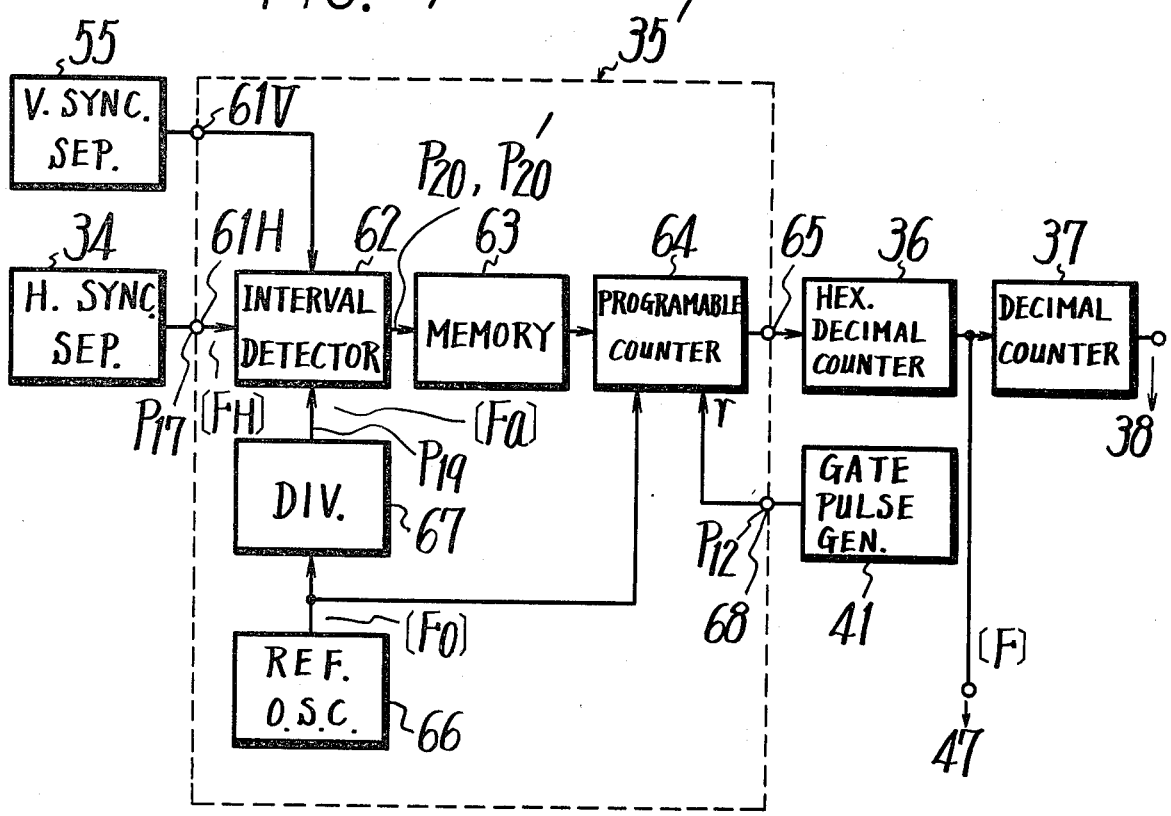
FIG. 7
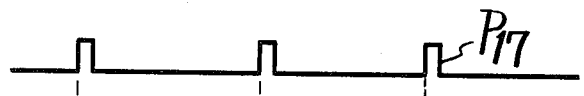
FIG. 8A
FIG. 8B
FIG. 8B'
FIG. 8C
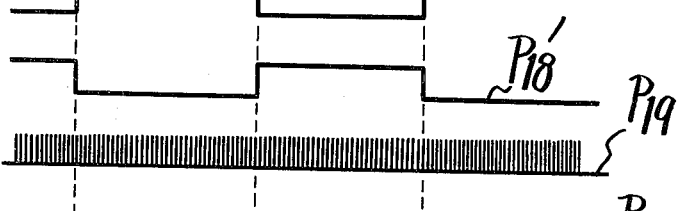
FIG. 8D
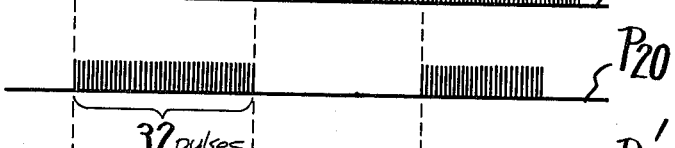
FIG. 8D'
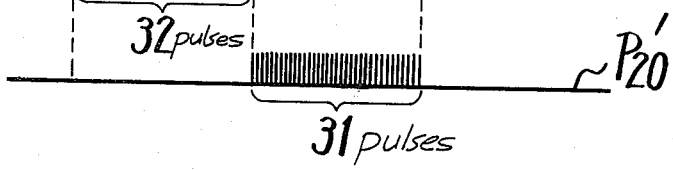

CODE SIGNAL READING APPARATUS

CROSS-REFERENCE TO RELATED APPLICATION

This application is a continuation-in-part of our co-pending application, U.S. Ser. No. 047,765, filed June 12, 1979, and assigned to the same assignee as the present invention, now abandoned.

BACKGROUND OF THE INVENTION

1. Field of the Invention

This invention relates to a code signal reading apparatus for reading a code signal from a video signal reproduced from a recording medium on which the video signal is recorded so as to form one recording track at every field or at every frame with the code signal formed by pulse-modulating a reference clock pulse for indicating an absolute address being inserted in a predetermined interval within a field period.

2. Description of the Prior Art

It has been known that when a video signal is recorded on a magnetic tape, a time code signal acting as an index of the video signal is recorded together with the video signal and this time code signal is utilized to carry out electronic editing. One type of time code signal is known an SMPTE time code signal which is recorded on the magnetic tape at its audio track or Q-track, but another time code signal is also known as a VITC time code signal which was previously proposed. This will be hereinafter described.

Different from the SMPTE time code signal, the VITC time code signal is recorded on a recording track (a slant track) of the video signal at a condition that it is mixed with one part of the video signal. In other words, the same VITC signal is repeatedly inserted in, for example, three successive horizontal periods which are located following the latter equalizing pulse period within a vertical blanking interval of the video signal at each field.

SUMMARY OF THE INVENTION

This invention is to provide a code signal reading apparatus which can positively read a code signal even though the relative speed of a recording medium such as a magnetic tape relative to a reproducing means such as a magnetic head is greatly shifted from the normal speed. In particular, this invention provides a code signal reading apparatus for reading the code signal from a video signal reproduced from a recording medium on which the video signal is recorded so as to form one recording track at every field or at every frame with the code signal formed by pulse-modulating a reference clock pulse for indicating an absolute address being inserted in a predetermined interval within a field interval, in which there are provided a reference oscillator, a programmable frequency divider for dividing the frequency of an oscillating signal of the reference oscillator, and a time width detector for detecting a time width of specific interval of the reproduced video signal, whereby a detected output of the time width detector is applied to the programmable frequency divider to control its frequency dividing ratio for producing a frequency signal relating to a local reference clock pulse for reading the code signal from the programmable frequency divider.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1, consisting of 1A-1D, are waveform diagrams showing a VITC signal;

FIG. 3, consisting of 3A-3K, are waveform diagrams showing VITC signal, clock pulse, timing pulse and the like;

FIGS. 5A-6D are waveform diagrams;

FIG. 7 is a block diagram showing one part of an embodiment of this invention;

FIGS. 8A-8D' are waveform diagrams;

DESCRIPTION OF THE PREFERRED EMBODIMENTS

Figure 2:
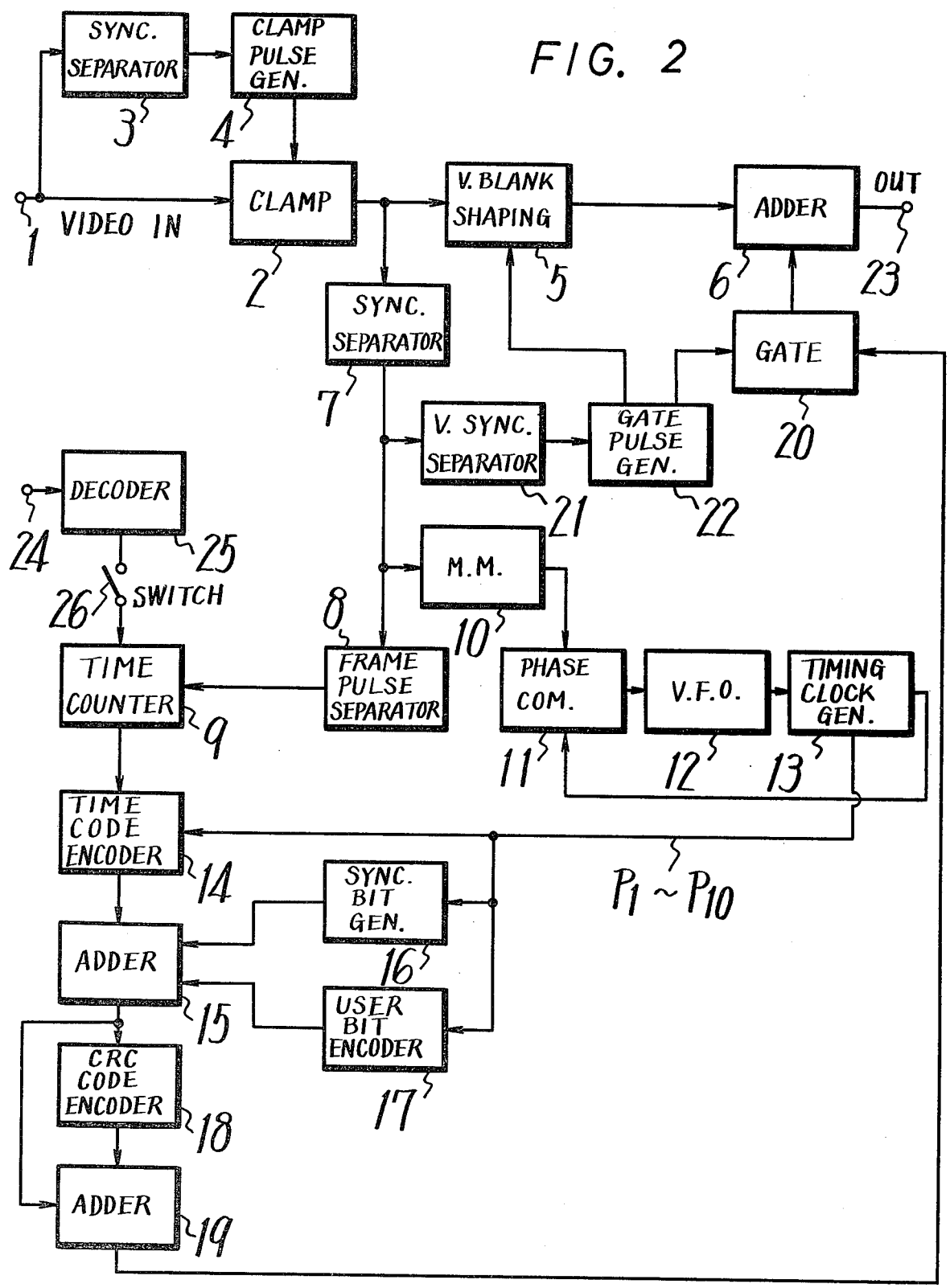
FIG. 2 is a block diagram showing a prior art code signal adding apparatus.

Referring now to the drawings, a detailed description of a preferred embodiment will now be described.

FIG. 1A shows an example of the VITC signal which is inserted in an NTSC color video signal during one horizontal period (1H). In FIG. 1A, HD designates a horizontal synchronizing signal and BS a burst signal. The sum of an interval of 1.54 $\mu$s before the front edge of the horizontal synchronizing signal HD and an interval of 9.56 $\mu$s back from this front edge is a horizontal blanking interval, and the VITC signal (a biphase signal is used) of that field is inserted within a video interval which is a remainder of the horizontal blanking interval from 1H. A bit frequency $f_b$ of the VITC signal is selected as follows:

$$f_b = 455/4 f_h \approx 1.79 \text{ MHz}$$

where $f_h$ is a horizontal frequency and the interval of 1H corresponds to 113.75 bits. The VITC signal relative to the video signal of one field recorded on one recording track is 90 bits, and its code arrangement is shown in FIG. 1B. As shown in FIG. 1B by hatched lines, the first 2 bits and other 2 bits at every 10 bits are selected to be synchronizing bits, and the synchronizing bits are encoded as "10". Four (4) bits after the first synchronizing bits and two (2) bits after the second synchronizing bits are encoded frame codes $F_1$ and $F_2$. The frame code $F_1$ represents the unit digit (0, 1, 2, ... 9) of the frame address and the frame code $F_2$ represents the tenth digit (10, 20, 30). One bit after the frame code $F_2$ is selected to be a drop frame bit D, and the next bit is a field code FL. In the first field FL=3̄7 0", and in the second field FL="1".

The four bits after the third and fourth synchronizing bits are designated as second codes $S_1$ and $S_2$, and the 4 bits after the fifth and sixth synchronizing bits are the minute codes $M_1$ and $M_2$. The 4 bits after the seventh and eighth synchronizing bits are the hour codes $H_1$ and $H_2$. Further, interspersed eight units $BG_1 \sim BG_8$, each consisting of 4 bits, are designated user bits. After these synchronizing bits, time codes and user bits, an error detecting code is provided, for example, a CRC (Cyclic Redundancy Check) code of 8 bits.

FIG. 1C shows a practical example of the code of the VITC signal, and FIG. 1D shows a signal waveform for that case. In this example, the time code indicates "23 hours, 59 minutes, 59 seconds, 29 frames", and the drop frame bitd D is "1" while the field code FL is "0".

Figure 3:
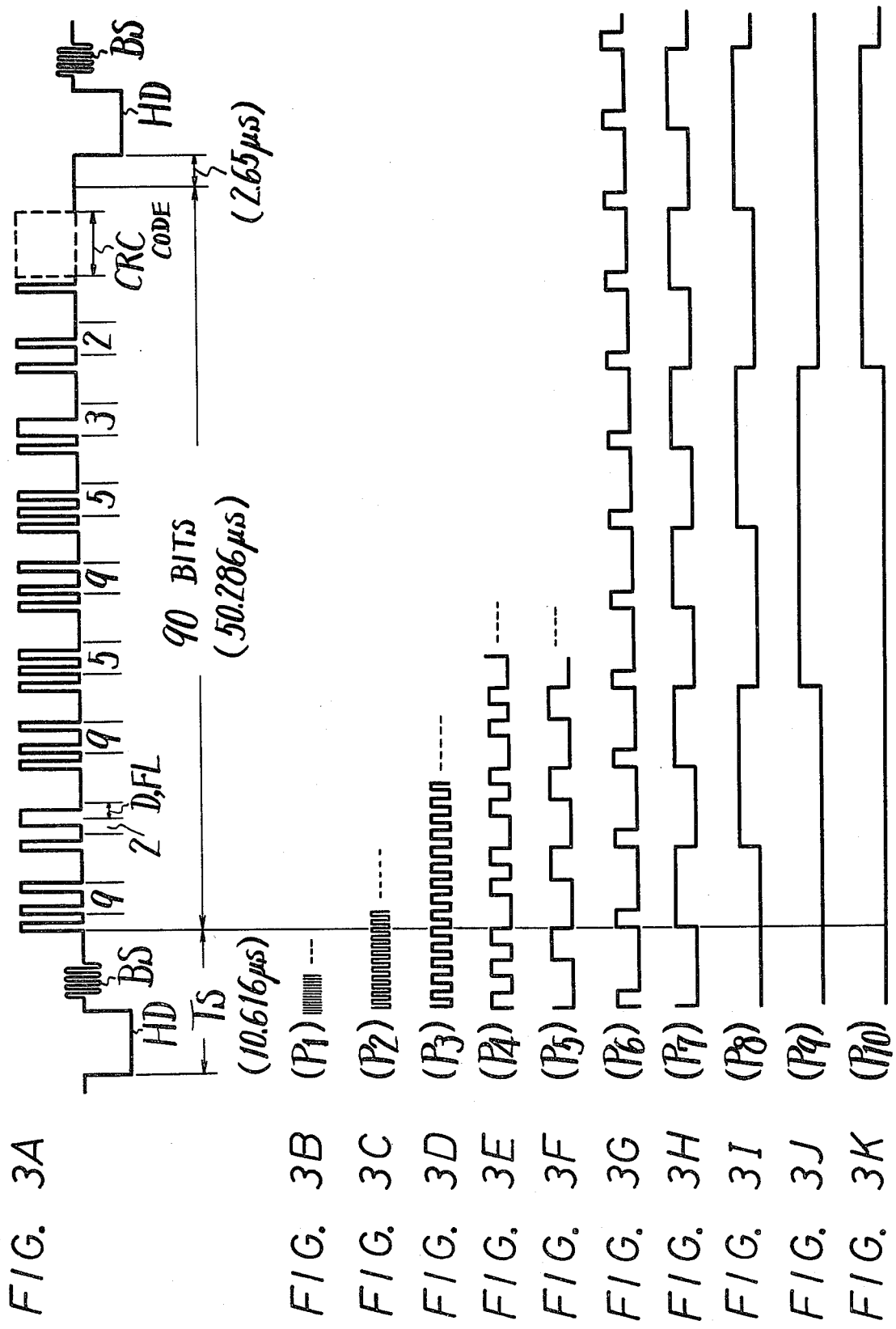

With reference to FIG. 2, a description will be given of one example of a code signal adding apparatus in which the above VITC code signal is formed and this signal is added to a video signal to produce the video signal having the VITC code signal. FIG. 3A shows a waveform of the VITC signal corresponding to FIG. 1D, and FIGS. 3B to 3K show waveforms of clock pulses, respectively. The following description also relates to FIG. 3.

In FIG. 2, reference numeral 1 designates a terminal to which a video signal to be recorded is supplied. This video signal is fed to a clamp circuit 2. Terminal 1 is connected to a synchronizing signal separator 3 which separates a synchronizing signal from the video signal. A clamp pulse generator 4 forms a clamp pulse from the synchronizing signal. The clamped video signal from the clamp circuit 2 is supplied through a vertical blanking period shaping circuit 5 to an adder 6 and is also supplied to a synchronizing signal separator 7. The output of the synchronizing signal separator 7 is delivered to a frame pulse separator 8 where a frame pulse is separated and this frame pulse is fed to a time counter 9. The output of the synchronizing signal separator 7 is fed to a monostable multivibrator (hereinafter referred to as a mono-multi) 10 to remove an equalizing pulse and then the mono-multi 10 produces a horizontal frequency $f_h$ signal which is supplied to a phase comparator 11. The phase comparator 11 forms a PLL circuit together with a variable frequency oscillator 12 and a timing clock pulse generator 13. The timing clock pulse generator 13 produces a signal of frequency $f_h$ and also clock pulses $P_1$–$P_{10}$ shown in FIGS. 3B to 3K. The signal of frequency $f_h$ is applied to the phase comparator 11 and its output is fed to the variable frequency oscillator 12 as a control signal and the timing clock pulse generator 13 produces the clock pulses $P_1$–$P_{10}$ which are synchronized with the horizontal synchronizing signal in the video signal.

The clock pulse $P_1$ is at the color subcarrier frequency $f_c$ and the clock pulse $P_2$ has a frequency of $\frac{1}{2}f_c$. One period of the clock pulse (reference clock pulse) $P_2$ is equal to one bit of the code signal shown in FIG. 3A. The clock pulse $P_3$ has a frequency of $\frac{1}{4}f_c$. The clock pulses $P_3$–$P_6$ are formed from the clock pulse $P_2$ by a decimal counter and the clock pulses $P_7$–$P_{10}$ are formed by a hexadecimal counter and have the form shown in FIGS. 3D–3K. The timing clock pulse generator 13 is designed so as to satisfy the above described results.

The clock pulse from the timing clock pulse generator 13 and the output of the time counter 9 are applied to a time code encoder 14 which forms a time code signal (frame codes, second codes, minute codes and hour codes), which is supplied to an adder 15. At the same time, the clock pulses from the timing clock pulse generator 13 are supplied to a sync bit generator 16 and a user bit encoder 17 to form sync bits and user bits, respectively. These sync bits and user bits are fed to the adder 15. Accordingly, the code signal in which time codes, user bits and sync bits are arranged as shown in FIG. 1B appears at the output of the adder 15. This code signal is delivered to a CRC code encoder 18 which derives a CRC code which is applied to an adder 19 and the output of the adder 19 comprises the code signal as shown in FIG. 1B. This code signal is supplied to a gate circuit 20. This gate circuit 20 is also supplied with gate pulses corresponding to three successive horizontal line periods in the vertical blanking period which pulses are formed by a gate pulse generator 22 based upon a vertical synchronizing pulse separated from the output of the synchronizing signal separator 7 by a vertical synchronizing signal separator 21. The code signal is gated by these gate pulses and supplied to the adder 6. The adder 6 is also fed with the video signal from which there is removed a code signal which may have been inserted in the vertical blanking period at the vertical blanking period shaping circuit 5 by the gate pulse from the gate pulse generator 22. Accordingly, at the output terminal 23 of the adder 6 there appears the video signal in which the code signals are inserted into three successive horizontal periods within the vertical blanking period. This video signal is recorded on a magnetic tape with a signal recording system of the VTR including FM modulator.

A terminal 24 receives, for example, the SMPTE code from an outside source, which is fed through a decoder 25 and a preset switch 26 to the time counter 9 to preset it when the preset switch 26 is ON so as to synchronize the SMPTE code from the outside source with the time code to be inserted into the video signal.

One example of a code signal reading apparatus for reproducing the video signal including the VITC code signal recorded on the magnetic tape to derive the VITC code signal from the reproduced video signal with reference to FIG. 4 will be described.

Figure 4:
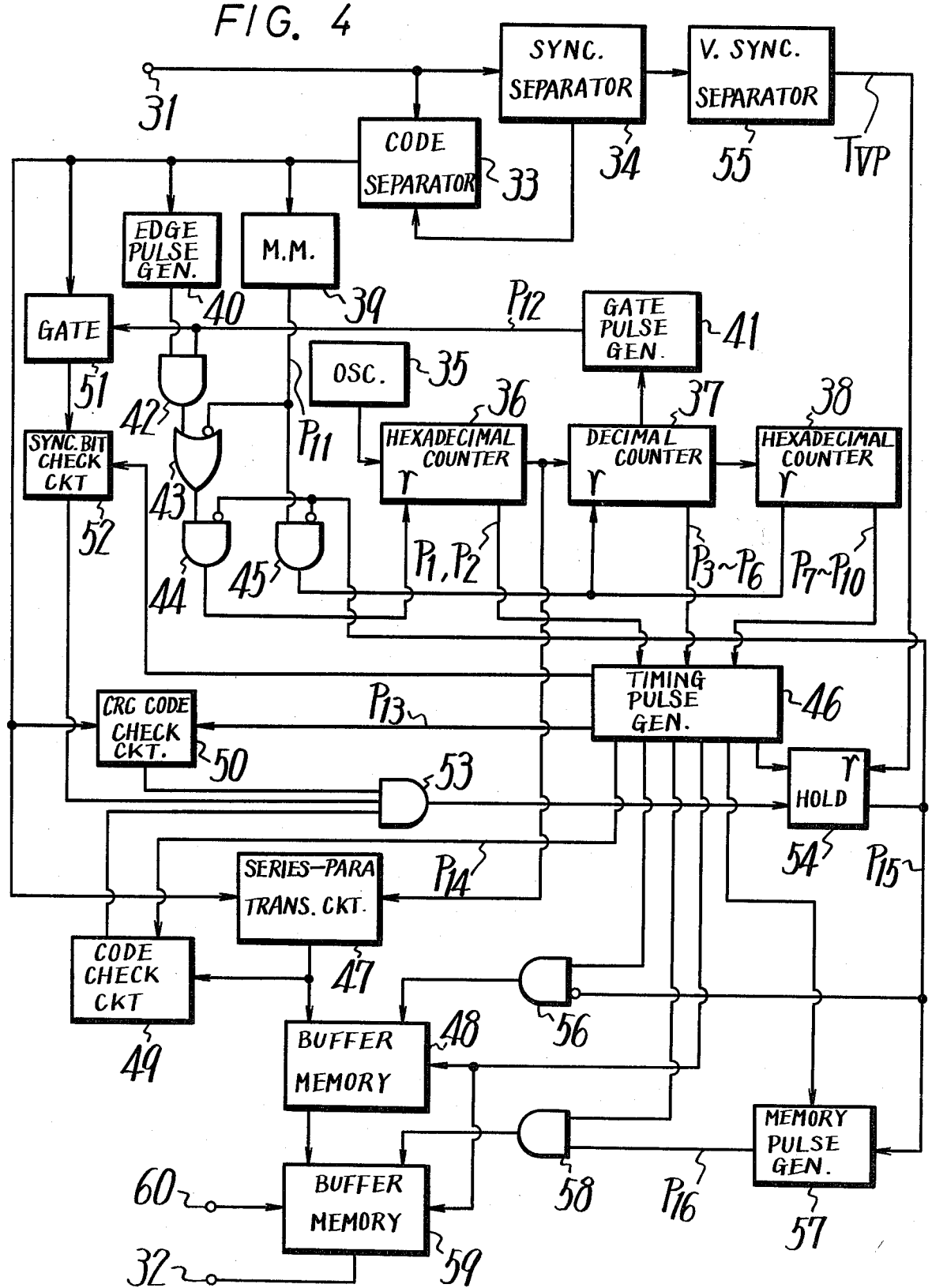
FIG. 4 is a block diagram showing a prior art code signal reading apparatus.

In FIG. 4, an input terminal 31 receives the reproduced video signal. The code signal is detected from this video signal in a manner as described below and this code signal is supplied to an output terminal 32. First the reproduced video signal is applied to a code separator 33 to separate the code signal from the video signal with a synchronizing signal which is separated with a synchronizing signal separator 34. There is provided a fixed oscillator 35 oscillating at a frequency which is an integral multiple (for example, 4 times) of $f_c$. An output of the oscillator 35 is fed to an octadic counter 36, an output (local reference clock pulse) of this counter 36 has a frequency of $\frac{1}{2}f_c$ which is applied to a decimal counter 37, and an output of the counter 37 is fed to a hexadecimal counter 38. The counter 36 output has derived therefrom the aforesaid clock pulses $P_1$ and $P_2$ as in the recording mode, and the counter 37 output has derived therefrom the clock pulses $P_3$–$P_6$, and the counter 38 output has derived therefrom the clock pulses $P_7$–$P_{10}$. These clock pulses $P_1$–$P_{10}$ are synchronized with the code signal separated from the reproduced video signal. Thus, the separated code signal shown in FIG. 5A is fed to a mono-multi 39 to generate a pulse $P_{11}$ which is a little narrower than a horizontal period but wider than a period containing a code signal of 90 bits as shown in FIG. 5C. The code signal is also supplied to an edge pulse generator 40 to generate an edge pulse at a trailing edge of the code signal. Further, the output of the counter 37 is delivered to a sync bit gate pulse generator 41 to produce a sync bit gate pulse $P_{12}$ shown in FIG. 5B which becomes "1" when the phase of sync bits are similar to the clock pulse $P_6$.

Now, let it be assumed that the code signal including sync bits of "10" as shown in FIG. 6A is separated from the video signal. Then, the edge pulse generator 40 generates an edge pulse in synchronism with the trailing edge of the code signal as shown in FIG. 6B. This edge pulse and the sync bit gate pulse $P_{12}$ shown in FIG. 6C are supplied to an AND gate 42 and an edge pulse synchronized with the trailing edge of the sync bit is derived from this AND gate 42. This edge pulse is supplied through an OR gate 43 and an AND gate 44 to the counter 36 as its reset pulse. Accordingly, the output pulse of the counter 36 having a frequency of $\frac{1}{2} f_c$ is corrected for phase difference $\tau$ with the timing of the code signal as shown in FIG. 6D and synchronized with the code signal. With the above construction, even when the time axis of the reproduced video signal fluctuates from normal due to jitter, slow motion reproduction or the like, the timing of the clock pulse will be synchronized with the reproduced code. Also, the sync bits are inserted at every ten bits, so that it is possible to achieve a very precise synchronization. The counters 37 and 38 are reset by the rising edge of the output pulse $P_{11}$ of the mono-multi 39 which is passed through an AND gate 45.

The output pulses from the counters 36, 37 and 38 are supplied to a timing pulse generator 46 to form required timing pulses. The output pulse from the counter 36 and the separated code signal are supplied to a series-parallel transformation circuit 47 which consists of a shift register to transform the code signal except for the sync bits and the CRC code, that is, time codes and user bits (total 64 bits) into parallel codes each consisting of four bits. These parallel codes are sequentially written into a buffer memory 48 which may be, for example, a RAM and the codes are also supplied to a code check circuit 49.

The code check circuit 49 receives a timing pulse $P_{14}$ corresponding to the position of the time code as shown in FIG. 5E from the timing pulse generator 46 and decodes the time code of four bits from the series-parallel transformation circuit 47 and checks the decode numbers to determine whether they are possible numbers at the respective digits. For example, the possibility is checked whether the hour code of the time code shows 27 hours or whether the second code shows 81 seconds and if these impossible readings are indicated dropout occurs. As a result of the check, the code check circuit 49 generates a discriminating output signal which is "1" if it is correct and "0" if it is incorrect.

The code signal from the code separator 33 is also fed to a CRC code check circuit 50. The CRC code check circuit 50 is fed with a pulse $P_{13}$ having a phase which is coincident with the position of the CRC code as shown in FIG. 5D from the timing pulse generator 46 to operate in such a manner that the code signal including the CRC code is divided by a predetermined code signal and the remainder is checked to determine whether it is zero. If the remainder is zero, it is discriminated as correct and the discriminated output of the CRC code check circuit 50 becomes "1", while if the remainder is not zero, it is discriminated as incorrect and the discriminated output becomes "0".

Further, the previously mentioned sync bit gate pulse $P_{12}$ (FIG. 5B) is applied to a gate circuit 51 to obtain from the code signal a sync bit which is supplied to a sync bit check circuit 52. The sync bit check circuit 52 is also fed with a suspected sync bit from the timing pulse generator 46 thereby to check whether the sync bit is correct or not. The discriminated output of the sync bit check circuit 52 becomes "1" when the sync bit is correct and "0" when incorrect.

The discriminated outputs from sync bit check circuit 52 and the code check circuit 49 and CRC code check circuit 50 are supplied to an AND gate 53. When the output of AND gate 53 is "1", that is, the code signal is detected as correct, the timing pulse from the timing pulse generator 46 is applied to a hold circuit 54 to generate a pulse $P_{15}$ which becomes "1" as shown in FIG. 5G. Hold circuit 54 is reset by a vertical synchronizing pulse $T_{VP}$ shown in FIG. 5F from a vertical synchronizing signal separator 55 which is connected to the synchronizing signal separator 34. Thus, the output pulse $P_{15}$ of the hold circuit 54 is supplied to the AND gates 44 and 45 in inverted form. Thus, when the pulse $P_{15}$ becomes "1", the reset of counters 36, 37 and 38 is prevented. The inverted form of pulse $P_{15}$ is also fed to an AND gate 56 and also to a memory pulse generator 57. The AND gate 56 supplies a writing clock pulse for the buffer memory 48. During the period that the pulse $P_{15}$ is "0", the codes of four bits from the series-parallel transformation circuit 47 are sequentially written, but when the pulse $P_{15}$ becomes "1", such writing is prevented. The memory pulse generator 57 generates a memory pulse $P_{16}$ which is synchronized with the rising edge of the pulse $P_{15}$ as shown in FIG. 5G. When this memory pulse is fed to an AND gate 58, the AND gate 58 feeds a writing clock pulse to a buffer memory 59 so that the contents of the buffer memory 48 are transferred to the buffer memory 59. A readout address signal is supplied to memory 59 from a terminal 60 and the output data of 64 bits in all consisting of time codes and user bits appears at the output terminal 32. This data is fed to a display apparatus, editing apparatus or other equipment. As mentioned previously, the code signals are inserted into three successive horizontal periods of the vertical blanking period. However, if the code signal in the first horizontal period is assumed to be incorrect, the pulse $P_{15}$ from the hold circuit 54 does not rise and the data is not transferred from the buffer memory 48 to the buffer memory 59. The code signal in the next horizontal period is then checked in the same manner and only the correct code signal is stored in the buffer memory 59. Accordingly, it is not necessary to insert the code signal in the vertical blanking period into successive horizontal periods. If either one of the code signals is correctly read at any position within the vertical blanking period, it will be held.

In the above embodiment, the VITC time code signal indicating the absolute address of the track is recorded on the conventional slant track $T_V$. Such slant tracks are well known and are disclosed, for example, in my U.S. Pat. No. 4,134,130. At the same time, it is possible that a code signal the same as the VITC time code signal can be recorded on the track $T_V$ or the SMPTE time code signal can be recorded on the track which extends in the longitudinal direction of the magnetic tape at the side edge by a bi-phase system.

In the code signal reading apparatus of FIG. 4, there is provided the fixed oscillator 35 of frequency $mf_c = 4f_c$ (m is an even number), and its oscillating output is supplied to the octadic counter 36 to produce the local clock pulse $P_2$ of frequency $\frac{1}{2} f_c$. Based upon this pulse, the clock pulses $P_3$, $P_4$ . . . , are produced and these clock pulses are used to read the VITC time code signal, as a code signal indicating the absolute address, from the reproduced video signal from the magnetic tape.

There is no problem when the moving speed of the magnetic tape is normal. However, if it is shifted much from the normal speed, it becomes difficult to positively read the VITC signal by the above-mentioned clock pulses $P_2, P_3, \ldots$, of constant frequencies. With the code signal reading apparatus of FIG. 4, if the bit frequency of the reproduced VITC signal is varied from $\frac{1}{2}f_c$ by more than about ±3%, it becomes difficult to read the VITC signal.

This invention has an object to provide a code signal reading apparatus which can positively read a code signal even though the relative speed of a recording medium such as a magnetic tape relative to a reproducing means such as a magnetic head is shifted substantially from the normal speed.

An embodiment of this invention will hereinbelow be described. However, the greater part thereof is similar to the aforesaid apparatus of FIG. 4, so that the different portion of the invention (surrounded by a dotted line 35') will be described with reference to FIG. 7 and the other portions will be omitted in the explanation.

This invention is concerned with a code signal reading apparatus for reading a code signal from a video signal reproduced from a recording medium on which the video sigal is recorded so as to form one recording track at every field or at every frame with the code signal formed by pulse-modulating a reference clock pulse for indicating an absolute address being inserted in a predetermined interval within a field interval. As shown in FIG. 7 there are provided a reference oscillator 66, a programmable frequency divider 64 for dividing the output frequency $F_o$ of the reference oscillator 66, and a time width detector 62 for detecting the time width of a specific interval of the reproduced video signal, and a detector output of the time width detector 62 is applied to the programmable frequency divider 64 to control its frequency dividing ratio and for producing a frequency signal which relates to a local reference clock pulse for reading the code signal at output terminal 65 from the programmable frequency divider 64 (a frequency signal having a frequency which is an even-number times the local reference clock frequency). The decimal counter 37 supplies an input to gate pulse generator 41 as shown in FIG. 4 and also to hexadecimal counter 38.

The reference oscillator 66 may be, for example, a crystal oscillator (a fixed oscillator) which has a very high stability of its oscillating frequency. The programmable frequency divider 64 may be a counter such as a type 5080P programmable divider by N8 available from R.C.A. At the time width detector 62, as the specific interval of the reproduced video signal there is adopted, for example, an interval between adjacent horizontal synchronizing signals, or a reproduced horizontal period. For this specific interval, there can be selected an arbitrary interval of the whole video signal including the VITC signal. For the specific interval, in addition to the above, there can also be utilized an interval between the horizontal synchronizing signal and the sync bit signal of the VITC signal, or an interval of the sync bit signals. In the time width detector 62, the time interval between horizontal synchronizing signals of the reproduced video signal is counted by using clock pulses, and the counted value is supplied to a memory device 63 and is stored therein. Then, an output of the memory device 63, or a time width of a reproduced horizontal period, which is detected before one horizontal period, is fed to the programmable frequency divider 64 to control its frequency dividing ratio.

Figure 9:
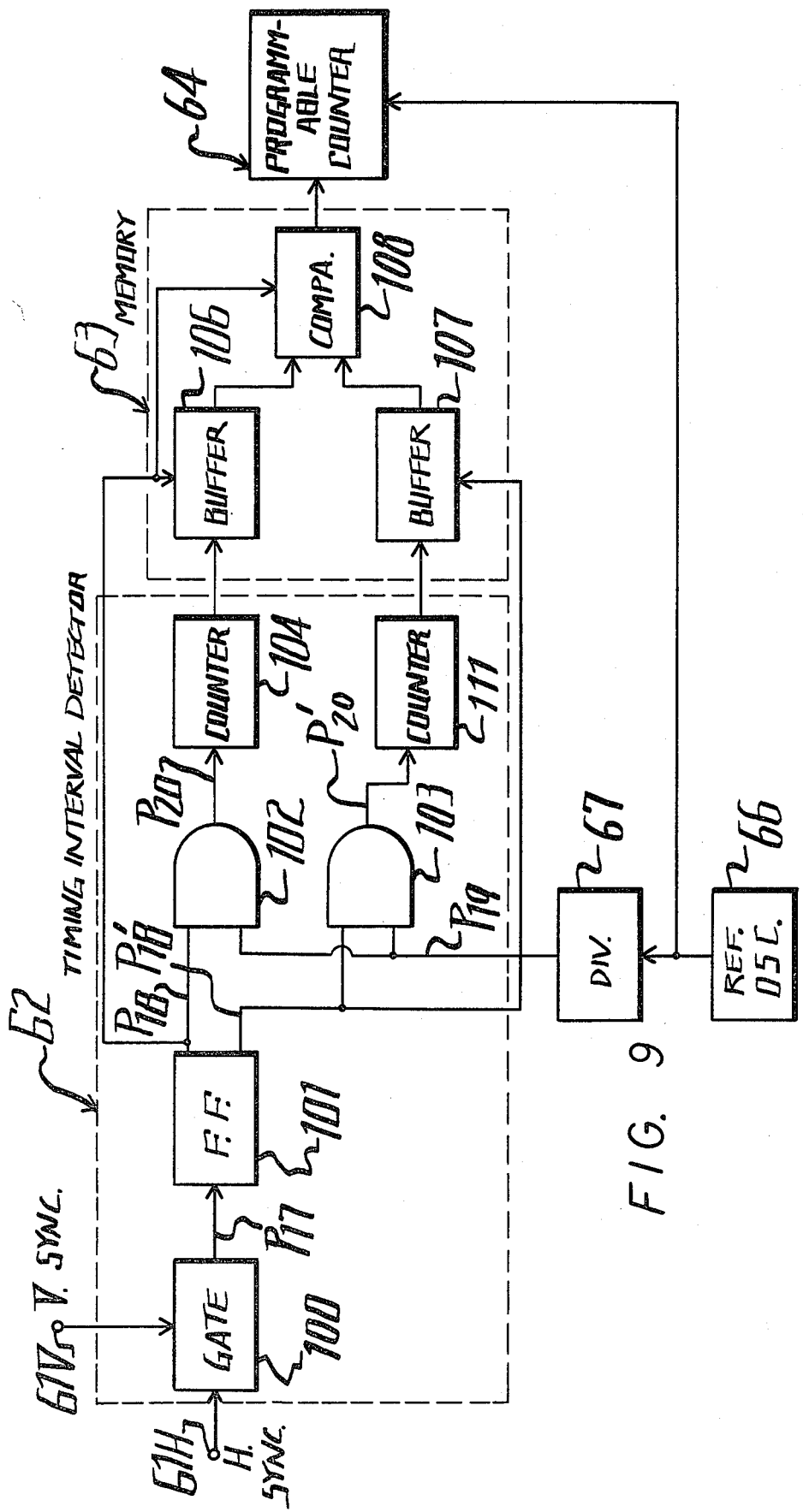
FIG. 9 is a block digram of elements 62-66.

The reproduced horizontal synchronizing signal derived from the synchronizing signal separator 34 of FIG. 4 is supplied from an input terminal 61H to the time width detector 62, while the reproduced vertical synchronizing signal derived from the vertical synchronizing signal separator 55 is applied from an input terminal 61V to the time width detector 62. The horizontal synchronizing signals $P_{17}$ (FIG. 8A) in the whole or a given interval excepting the vertical blanking interval are extracted with the vertical synchronizing signal used as a reference, and a rectangular wave signal $P_{18}$, $P_{18'}$ (FIGS. 8B, 8B') of a time width corresponding to an interval between the adjacent horizontal synchronizing signals, or corresponding to the reproduced horizontal period, is formed by supplying the horizontal synchronizing signals to, for example, a flip-flop circuit as shown in FIG. 9. In this case, if not only one but both of outputs of $P_{18}$, $P_{18'}$ the flip-flop circuit, which are opposite in phase are used, the rectangular wave signal of a time width corresponding to the reproduced horizontal period can be continuously produced. Then, there are provided AND gates to which clock pulses $P_{19}$ (FIG. 8C) are supplied and these pulses are gated by the rectangular wave signals $P_{18}$, $P_{18'}$ (FIGS. 8B, 8B') to obtain intermittent pulses $P_{20}$, $P_{20'}$ (FIG. 8D, 8D') having pulse numbers corresponding to the reproduced horizontal period. These clock pulses $P_{19}$ are formed in a frequency divider 67 by frequency-dividing, for example, the output of the reference oscillator 66. When these intermittent pulses $P_{20}$, $P_{20'}$ are fed to a counter to be counted, the time width of the reproduced horizontal period can be obtained. The time width thus detected by the time width detector 62 is supplied to the memory device 63 and stored therein.

Next, the output frequency of the reference oscillator 66 and the frequency-dividing ratios of the frequency dividers 64 and 67 will be studied. In this case, a consideration is given of a case where a magnetic tape is moved at a normal speed and the reproduced horizontal frequency is 15.75 KHz. Let it be assumed that the frequency of the horizontal synchronizing signal is $F_H$, the color subcarrier frequency $F_C$, the frequency of the clock pulse fed to the time width detector 62, $F_a$. Thus, based on the above explanation, the frequency F of the local reference clock pulse should be selected as follows:

$$F=\tfrac{1}{2}F_C=455/4F_H$$

Accordingly, the lowest frequency necessary for the reference oscillating frequency $F_0$ can be selected as follows:

$$F_0=F\cdot N\cdot m$$

In this case, when the allowable value of the frequency variation of the reproduced VITC signal, which can be correctly read out even though the moving speed of the magnetic tape at a reproducing mode is slightly shifted from its normal speed, is made less than ±k%, the quantization of a reproduced horizontal period at every k% is desirable from a viewpoint of the simplification of a quantization circuit and hence this quantizing step N is determined as follows:

$$N=100/k[\text{steps}]$$

Further, m is an even number and corresponds to the step-down ratio of the counter 36 which is connected to the next stage of the programmable counter 64 as will be described later. Thus, if the frequency $F_a$ of the clock pulse is selected as defined by the following equation, the number of clock pulses $P_{19}$ is fed to the time width detector 62 at the normal moving speed of the magnetic tape can be selected to be N pulses during an interval of one horizontal period.

$$F_a = \frac{F_0}{\frac{455}{4} m}$$

Now, $N = 32(k - 3.125)$ is assumed. That is, as a practical example, when the moving speed of the mgnetic tape is varied, even though the output of the reference frequency oscillator 66 is used, as it is, without being controlled by the programmable counter 64, the VITC code signal can be read out if the frequency variation is about ±3%. Therefore, if the quantization of one horizontal period at every about 3% is considered, by way of example, the quantizing step N is expressed as $N - 100/3 = 32(k - 3.125)$. Further, if $m = 8$ is also assumed, $F_0$ is expressed as follows:

$$F_0 = F_H \times \frac{455}{4} \times 32 \times 8$$
$$= (F_H \times 910) \times 32$$

Accordingly, if $F_a$ is selected as determined by the following equation, at the output of the time width detector 62, thirty-two (32) pulses can be caused to exist during one horizontal period when the magnetic tape is moved at a normal speed.

$$F_a = 32 F_H = \frac{F_0}{\frac{455}{4} \times 8} = \frac{F_0}{910}$$

Further, since $F_H$ is 15.75 KHz in the NTSC television system, $F_0$ is expressed by the following equation:

$$F_0 = 14.31818 \times 32 \text{ MHz}$$

Accordingly, the frequency-dividing ratio of the frequency divider 67 is selected to be 1/910. The frequency-dividing ratio of the programmable frequency divider 64 becomes 1/32 when the reproduced horizontal frequency is 15.75 KHz and changes according to the variation of the reproduced horizontal frequency. At an output terminal 65 of the programmable frequency divider 64 there is obtained a signal having a frequency of $mF = 8F = 4F_C$. This frequency signal is fed to the counter 36 shown in FIG. 4 where it is frequency-divided to ⅛ to obtain a local reference clock signal having a frequency F which changes according to the moving speed of the magnetic tape. The counter 64 also receives at its reset input terminal r the sync bit gate pulse $P_{12}$ from the circuit 41 of FIG. 4 for reset pulse through an input terminal 68.

According to this invention described above, in the code signal reading apparatus, the frequency F of the local reference clock signal is changed according to the time width of a specific interval of a reproduced video signal, so that even though the relative speed of the recording medium to the reproducing means is greatly shifted from the normal speed, a code signal indicating the absolute address can be positively read out from the reproduced video signal.

FIG. 9 shows in more detail the timing interval detector 62. A gate 100 receives the vertical sync signal from terminal 61V and the horizontal sync signal from terminal 61H. A flip-flop 101 receives the output of gate 100 and supplies outputs of opposite phase to AND gates 102 and 103. Gates 102 and 103 also receive inputs from divider 67 which is driven by oscillator 66. A counter 104 receives the output of gate 102. A counter 111 receives the output of gate 103. The counter 104 supplies an output to buffer 106. The counter 111 supplies an input to buffer 107. The flip-flop 101 supplies out of phase inputs to the buffers 106 and 107 and also an input to the comparator 108. The comparator 108 may be a type 4019 A quad and/or select gate available from RCA. The programmable counter 64 receives the output of comparator 108 and an output from oscillator 66. It is to be realized that this invention allows video signals to be read when the signal is being reproduced at non-standard speeds and the key difference from the prior art circuit is that the circuits of FIGS. 7, 9 and 10 have replaced the fixed frequency oscillator 35 in FIG. 4.

Figure 10:
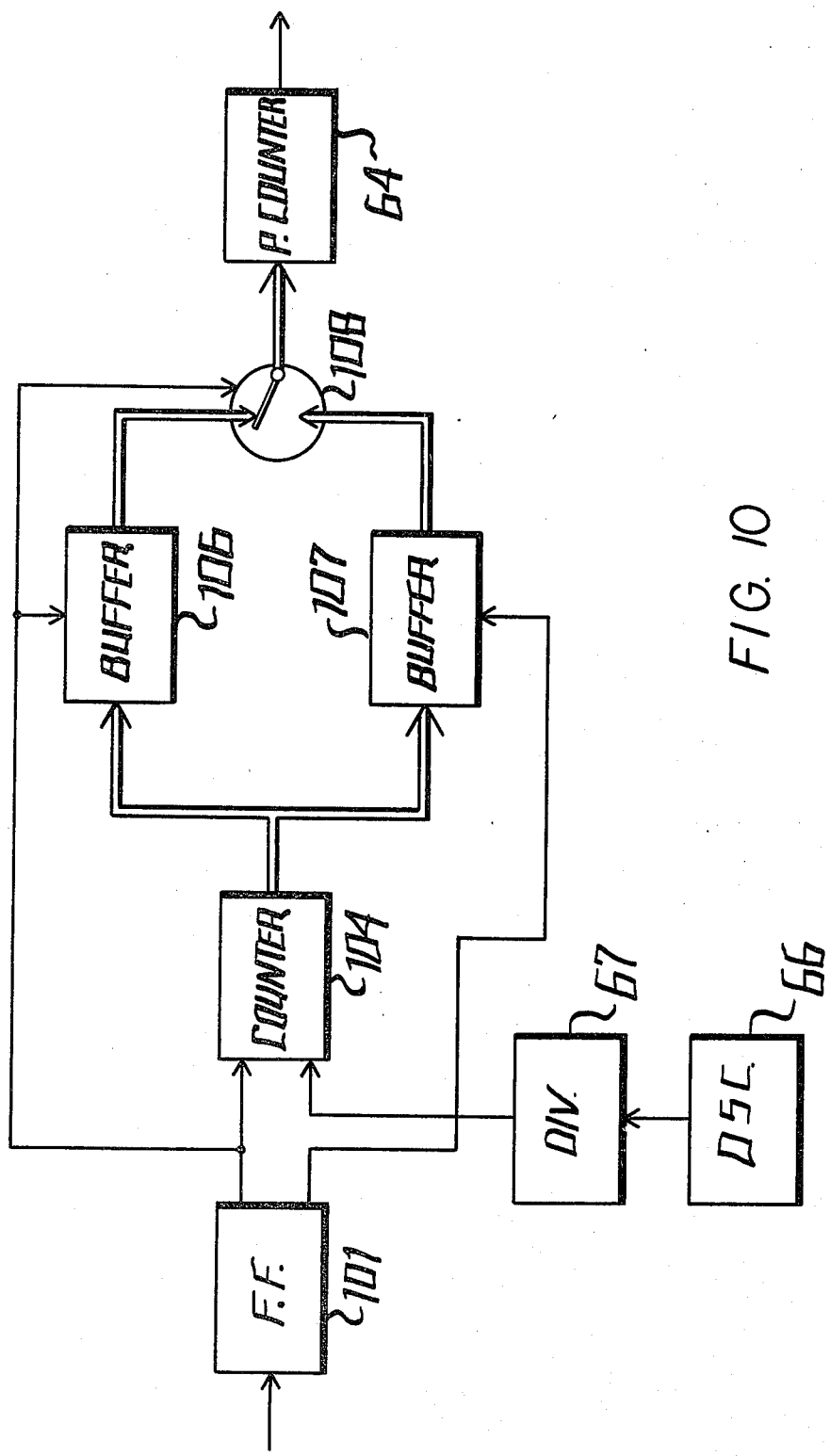
FIG. 10 illustrated a modified form of the invention.

A modified form of elements 101 and 62 through 66 are illustrated in FIG. 10. In this embodiment, the AND gates 102 and 103 of FIG. 9 are eliminated and the output of the flip-flop is supplied directly to the counter 104 which supplies outputs to the buffers 107 and 106 which are in turn connected to two inputs of the comparator 108' which has its output connected to the programmable counter 64. The flip-flop 101 supplies inputs to the buffers 106 and 107 as well as to the comparator 108'. The comparators 108 and 108' may be conventional quad and/or select gate integrated circuits such as type 4019A quad and/or select gate available from RCA.

It will be apparent to those skilled in the art that many modifications and variations may be effected without departing from the spirit and scope of the novel concepts of the present invention.

I claim as my invention:

1. In a code signal reading apparatus for reading a code signal from a video signal reproduced from a recording medium on which said video signal is recorded so as to form one recording track at every field or at every frame with said code signal formed by pulse-modulating a reference clock pulse for indicating an absolute address being inserted in a predetermined interval of a field period, a variable oscillator source comprising a reference oscillator, a programmable frequency divider connected to the output of said reference oscillator for frequency-dividing the output signal, a time width detector circuit detecting the time width of a specific interval of said reproduced video signal and comprising a first gate receiving horizontal and vertical sync signals, a flip-flop connected to the output of said first gate and producing a pair of out-of-phase signals, a first counter connected to the output of said programmable divider and said flip-flop, first and second buffers connected to the output of said first counter and receiving said pair of signals from said flip-flop, a comparator connected to the outputs of said first and second buffers and receiving an input from said flip-flop, and a second programmable counter receiving the output of said comparator and receiving an output from said programmable divider and producing the output of said variable oscillator source.

2. In a code signal reading apparatus for reading a code signal from a video signal reproduced from a recording medium on which said video signal is recorded so as to form one recording track at every field or at every frame with said code signal formed by pulse-modulating a reference clock pulse for indicating an absolute address being inserted in a predetermined interval of a field period, a variable oscillator source, comprising a reference oscillator, a programmable frequency divider connected to the output of said reference oscillator for frequency-dividing its output signal, a time width detector circuit detecting the time width of a specific interval of said reproduced video signal and comprising a first gate which receives horizontal and vertical sync signals, a flip-flop producing a pair of out-of-phase outputs connected to the output of said first gate, second and third gates connected to the outputs of said programmable divider and said flip-flop, first and second counters respectively connected to the outputs of said third and second gates, first and second buffers, respectively, connected to the outputs of said first and second counters and receiving inputs from said flip-flop, a comparator connected to the outputs of said first and second buffers and receiving one of said pairs of outputs of said flip-flop, and a third programmable counter connected to the output of said comparator and receiving an input from said programmable divider and producing the output of said variable oscillator source.

3. Apparatus according to claim 2 wherein a fourth counter receiving the output of said programmable counter and having an output frequency F and the output frequency $F_0$ of said reference oscillator is F times N times m wherein m is an even number and N is a whole number.

4. A code signal reading apparatus according to claim 2 including a fourth counter receiving the output of said third programmable counter, a fifth counter receiving the output of said fourth counter, a gate pulse generator receiving the output of said fifth counter and supplying a reset input to said third programmable counter.

* * * * *